US012596352B2

(12) United States Patent
Klein

(10) Patent No.: US 12,596,352 B2
(45) Date of Patent: Apr. 7, 2026

(54) SYSTEM AND METHOD FOR CONTROLLING A PRODUCTION PLANT CONSISTING OF A PLURALITY OF PLANT PARTS, IN PARTICULAR A PRODUCTION PLANT FOR PRODUCING INDUSTRIAL GOODS SUCH AS METALLIC SEMI-FINISHED PRODUCTS

(71) Applicant: SMS group GmbH, Düsseldorf (DE)

(72) Inventor: Carsten Andreas Klein, Düsseldorf (DE)

(73) Assignee: SMS group GmbH, Düsseldorf (DE)

( * ) Notice: Subject to any disclaimer, the term of this patent is extended or adjusted under 35 U.S.C. 154(b) by 541 days.

(21) Appl. No.: 17/924,788

(22) PCT Filed: May 12, 2021

(86) PCT No.: PCT/EP2021/062601
§ 371 (c)(1),
(2) Date: Nov. 11, 2022

(87) PCT Pub. No.: WO2021/228927
PCT Pub. Date: Nov. 18, 2021

(65) Prior Publication Data
US 2023/0205185 A1      Jun. 29, 2023

(30) Foreign Application Priority Data
May 14, 2020      (DE) ..................... 10 2020 206 114.9

(51) Int. Cl.
*G05B 19/418*      (2006.01)
(52) U.S. Cl.
CPC .................. *G05B 19/41835* (2013.01); *G05B 2219/31395* (2013.01)

(58) Field of Classification Search
CPC .... G05B 19/41835; G05B 2219/31395; G05B 13/027; G05B 19/41875;
(Continued)

(56) References Cited

U.S. PATENT DOCUMENTS 6,842,656 B1      1/2005  Burkhardt et al.
10,365,640 B2     7/2019  Baseman et al.
(Continued)

FOREIGN PATENT DOCUMENTS

DE        19930173 A1      1/2001
EP        3474091 A1       4/2019
(Continued)

OTHER PUBLICATIONS

Primetals Technologies Austria GmbH, Through-process optimization, primetals Technologies Austria GmbH, 2018.
(Continued)

*Primary Examiner* — Christopher E. Everett
(74) *Attorney, Agent, or Firm* — Smartpat PLC

(57)      ABSTRACT

A system for controlling a production plant includes a plant automation unit for monitoring and control of the production process within the production plant. A production planning system has information concerning the products to be produced. A model generator generates at least one prediction model for products produced in the production plant. The model generator takes into account the results of the monitoring of the production plant when generating the at least one prediction model. A production optimizer determines an optimized production process within the production plant on the basis of data from the plant automation unit, the production planning system, and the prediction model generated by the model generator. The production optimizer takes into account the production-related specifications of the individual plant parts. A production plant control unit gen-
(Continued)

erates target specifications for the plant automation unit on the basis of the optimized production process determined by the production optimizer.

20 Claims, 1 Drawing Sheet

(58) Field of Classification Search
CPC .... G05B 2219/32104; G05B 19/41865; G05B 2219/32015; G05B 2219/32111; Y02P 90/02; G06N 20/00
See application file for complete search history.

(56) References Cited

U.S. PATENT DOCUMENTS

| | | | | |
|---|---|---|---|---|
| 2012/0191235 | A1* | 7/2012 | Shin | G06Q 10/04 |
| | | | | 700/104 |
| 2018/0157225 | A1* | 6/2018 | Dave | G06F 16/24566 |
| 2019/0188584 | A1* | 6/2019 | Rao | G06Q 10/00 |

| | | | | |
|---|---|---|---|---|
| 2019/0243346 | A1 | 8/2019 | Baseman et al. | |
| 2019/0265686 | A1 | 8/2019 | Obata et al. | |
| 2020/0160227 | A1* | 5/2020 | Liu | G06N 20/00 |
| 2021/0197205 | A1 | 7/2021 | Weng | |
| 2023/0053545 | A1* | 2/2023 | Fanidakis | G05B 23/0281 |
| 2023/0134786 | A1* | 5/2023 | Woll | B27N 1/00 |
| | | | | 700/109 |

FOREIGN PATENT DOCUMENTS

| | | |
|---|---|---|
| JP | H06290165 A | 10/1994 |
| JP | 2001318712 A | 11/2001 |
| JP | 2019145042 A | 8/2019 |

OTHER PUBLICATIONS

Primetals Technologies, Industry 4.0 in Metals, The digitalization of steel production, MMMM New Delhi, Aug. 2016.
Winter, Günther. "Industry 4.0—we are a part of it." Stahl und Eisen, vol. 136, No. 3, Verlag Stahleisen MBH, 2016, pp. 73-79.

* cited by examiner

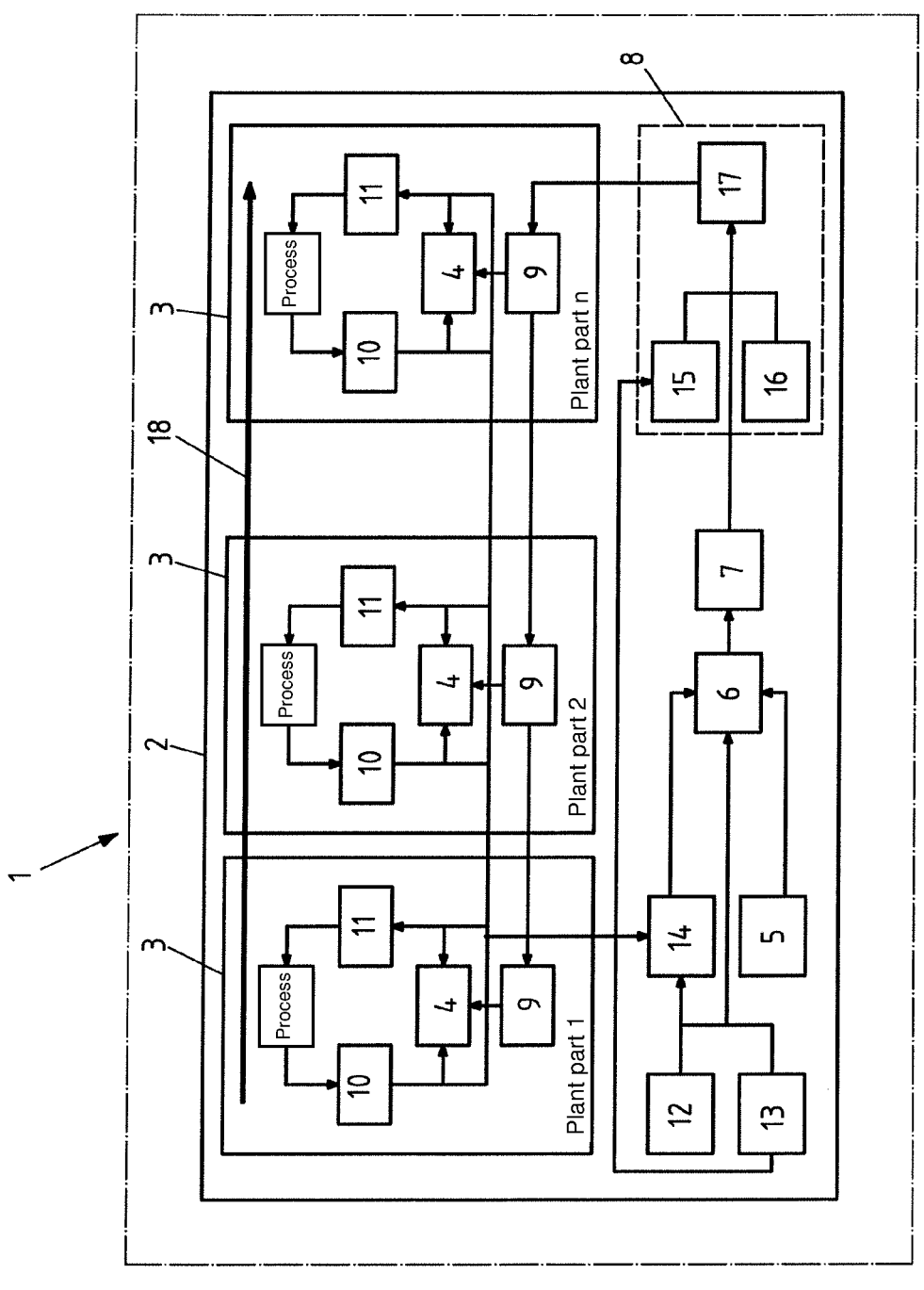

SYSTEM AND METHOD FOR CONTROLLING A PRODUCTION PLANT CONSISTING OF A PLURALITY OF PLANT PARTS, IN PARTICULAR A PRODUCTION PLANT FOR PRODUCING INDUSTRIAL GOODS SUCH AS METALLIC SEMI-FINISHED PRODUCTS

TECHNICAL FIELD

The invention relates to a system and method for controlling a production plant consisting of a plurality of plant parts, in particular a production plant for producing industrial goods such as metallic semi-finished products. The invention relates in particular to production plants for producing slabs, sheets or strips, beams or tubes of metal along with their preliminary products or for carrying out individual work steps in the course of production, with which product quality must be ensured.

BACKGROUND

Traditionally, products are produced as a sequence of individual processes. For each of these, there are one or more technological parameters, compliance with which is to ensure the achievement of the desired product properties. Compliance with the technological regulating variables is to be ensured by the various open-loop and/or closed-loop control systems, generally by the automation system of the plant.

The technological target specifications are usually determined in a sequence of theoretical considerations, simulations, laboratory tests and finally individual operational tests. Such formulations are mostly static and are not adjusted during the production sequence, or only in special cases by manual intervention.

Due to non-compliance or poorly selected technological target specifications, defects arise in products within industrial production, with the result that they cannot be used for the orders for which they were originally planned or, in the worst case, cannot be put to any commercial use at all.

An evaluation of production parameters during production and/or achieved qualities typically takes place manually, and a coupling between an evaluation and technological target specifications is not automated.

To improve the production of products in a production plant with a plurality of plant parts, U.S. Pat. No. 10,365,640 B2 proposes determining the interrelationships between the individual plant parts by means of machine learning and deriving control rules on the basis of detected quality parameters, which intervene in the plant control unit. The parameters of the individual plant parts are detected by means of sensors and the control rules are implemented via actuators in the plant parts. Thus, a monitoring across the plant with control interventions in the plant control unit takes place. However, the plant control unit is not generally optimized, but only intervened in its control by adjusting control rules.

SUMMARY

Based on this prior art, the present invention is based on the object of optimizing the production in a production plant consisting of a plurality of plant parts across the plant.

In accordance with the invention, the object is achieved by a system for controlling a production plant consisting of a plurality of plant parts, in particular a production plant for producing industrial goods such as metallic semi-finished products, comprising:

a plant automation unit for the monitoring and the open-loop and/or closed-loop control of the production process within the production plant, in particular for the monitoring and the open-loop and/or closed-loop control of the process within the plant parts, a production planning system having information concerning the products to be produced in the production plant, in particular with target criteria for the products to be produced, a model generator for generating at least one prediction model for the product currently being produced in the production plant and/or for the products to be produced in the future in accordance with the production planning system, in particular with regard to compliance with the target criteria for the products currently being produced or products to be produced in the future, wherein the model generator takes into account the results of the monitoring of the production plant, in particular of the plurality of plant parts, when generating the at least one prediction model, a production optimizer for determining an optimized production process within the production plant on the basis of the data from the plant automation unit, the production planning system and the prediction model generated by the model generator, wherein the production optimizer takes into account the production-related specifications of the individual plant components in determining the optimized production process within the production plant, and a production plant control unit for generating target specifications for the plant automation unit on the basis of the optimized production process determined by the production optimizer.

The production plant, in particular the plurality of plant parts of the production plant, each have a separate plant automation unit for the monitoring and the open-loop and/or closed-loop control of the production process within the production plant, in particular for the monitoring and the open-loop and/or closed-loop control of the process within the plant parts. The plant automation units of the plurality of plant parts are independent of one another and there is no exchange of information between the plant automation units of the plurality of plant parts.

A production plant control unit generates target specifications for the plant automation units of the plurality of plant parts. In the prior art, production plant control is performed separately for each plant part of the production plant.

Furthermore, a production plant usually has a production planning system having information concerning the products to be produced in the production plant, in particular with target criteria for the products to be produced. Thereby, the production planning system preferably works across the production plant, thus for all plant parts together. The production planning system contains information concerning the total products to be produced in the production plant, that is, by all plant parts.

The system in accordance with the invention further comprises a model generator for generating at least one prediction model for the product currently being produced in the production plant and/or for the products to be produced in the future in accordance with the production planning system. In particular, the prediction model relates to the prediction of the properties of the products to be produced currently or in the future that are essential for the target criteria. Thereby, the model generator takes into account the results of monitoring the production plant, in particular the plurality of plant parts, when generating the at least one prediction model. The prediction model generated by the model generator thus provides a prediction with respect to the current and future production process in the production plant, in particular a prediction of the product properties relevant for the target criteria, for example based on the type of production process, represented by process parameters characteristic for this process. The prediction model relates to the entire production plant, wherein the plurality of plant parts is taken into account.

For example, the model generator can use sensory and/or actuator data from the plant automation unit, in particular from the plurality of plant parts. The use of sensory data from the plant automation unit improves the accuracy of the prediction of the generated prediction model, while technological target specifications for the actuators or the individual open-loop and/or closed-loop control systems are available at an early stage of production.

In particular, the at least one prediction model determines a probability that one or more target criteria are within a defined range. The prediction model thus determines a probability that one or more target criteria of the product currently being produced in the production plant and/or products to be produced in the future lie within a defined range. On the basis of the determined probability, it can be determined whether the produced product is suitable for the intended use, i.e. has the specified product quality. Alternatively, the prediction model can predict a single value for a property relevant to the target criteria. In this case, the check is performed, for example, by determining the distance of a property relevant to a target criterion from the respective objective value or by monitoring the exceeding of a lower or upper limit value for such property.

The system in accordance with the invention further comprises a production optimizer for determining an optimized production process within the production plant on the basis of the data from the plant automation unit, the production planning system and the prediction model generated by the model generator. Thereby, the production optimizer takes into account the production-related specifications of the individual plant parts when determining the optimized production process within the production plant. This means that the production process is optimized across the production plant, taking into account all the information from the other systems in the production plant. Compared to the control of a production process known from U.S. Pat. No. 10,365,640 B2, there is not only a regulating intervention in the production process; rather, an optimization across the production plant also takes place.

According to one variant in accordance with the invention, the production plant is a plant of the metal-producing industry or the steel industry.

In accordance with another variant of the invention, the plurality of plant parts are selected from: Electric arc furnace, blast furnace, converter, ladle furnace, vacuum ladle treatment unit, continuous caster, foundry, hot rolling mill, casting-rolling line, reheating furnace, pickling line, cold rolling mill, annealing line, galvanizing line, tinning line, painting line, cross-cutting and slitting line, tube mill, beam mill, closed-die forge, open-die forge and/or leveler.

In a preferred variant of the invention, the plurality of plant parts in each case comprises sensors for detecting product properties, process parameters and/or operating states within the plant part. In each plant part, product properties, process parameters and/or operating states can thus be detected separately. The detection of product properties, process parameters and/or operating states is carried out by means of suitable sensors. In particular, the detection of product properties, process parameters and/or operating states is carried out continuously with the production of the products. However, the measurement of certain relevant properties only takes place at the end of the production process in the laboratory, in particular on samples that have been separated in advance.

According to an expedient variant of the invention, the plurality of plant parts in each case comprises actuators for adjusting the production process within the plant part. The actuators implement the target specifications for the plant automation unit. Thus, the target specifications are control commands for the actuators of the plant parts.

In accordance with one variant in accordance with the invention, the plant automation unit accesses the data of the sensors and/or actuators of the plurality of plant parts and/or transmits data to the sensors and/or actuators of the plurality of plant parts.

In an advantageous variant of the invention, the system further comprises a central data storage unit for the individual components of the system, wherein the individual components of the system may access the data and, in particular, may adapt data. The central data storage unit thus simplifies the exchange of data between the individual parts of the system in accordance with invention, in particular between the plurality of plant parts of the production plant and the higher-level components of the system in accordance with the invention. The central data storage unit can be located within the digital infrastructure of the production plant or outside as a so-called "cloud data storage unit."

According to an expedient variant of the invention, the target criteria are selected from: Thickness, width, length, weight, tensile strength, yield strength, Young's modulus, elongation at break, corrosion resistance, presence or number of surface defects of various types, number of cracks on the surface or within the material, DWTT results, Charpy results, transition temperatures from ductile to brittle fractures, layer thickness of the zinc layer, tube wall thickness, eccentricity, connecting bar height, flange height, flange thickness, profile, flatness and the like.

In accordance with an advantageous variant of the invention, the model generator is based on methods of statistics, machine learning, artificial intelligence or the like in order to generate the prediction model.

In a particularly advantageous variant of the invention, the model generator generates multiple prediction models that are different from one another, wherein the different prediction models differ, for example, with regard to the creation method, the original data and/or the learning algorithms. In particular, a plurality of prediction models is generated for the same target criterion, which, for example, takes into account different original data (input parameters). It is expedient that different prediction models with different sets of input parameters are used, in particular if different data concerning a product are available at different times during production, such that some of the prediction models are already applicable, while for other prediction models the necessary input parameters are not yet fully available, because the process step in which they are generated has yet to be executed.

In accordance with one variant in accordance with the invention, the model generator can use different sets of input variables in order to create the multiple prediction models that are different from one another. These can be values for which target specifications exist within the framework of automation (predefined variables) or measured values or signals that result reactively from the production process (measurement data). Expediently, such values are compiled on a process-step basis, such that prediction models are generated, which can be used right from the commencement of production, because they use only predefined variables, or prediction models for which all the measurement data required for the prediction model are available after a certain process step. This can be advantageous, because sometimes reactive measurement data contains information that is otherwise difficult to acquire, allowing for a more accurate prediction model.

For each set of input parameters, in general, a variety of prediction models such as, for example, neural networks, decision trees, support vector machines, linear models, discriminant analysis, Bayesian estimators, nearest neighbors, nonlinear multivariate regression, splines, can be created. Different metrics of evaluation can be used for selection. Thus, a prediction model is selected from the list of created prediction models for each step in which an updating of the target specifications for the automation is to take place, which the optimizer then uses. Evaluation metrics can be, for example, the mean square error, the mean absolute error, the coefficient of determination or the like.

According to an expedient variant of the invention, the process optimizer takes into account the prediction model that provides the currently best prediction for the product currently being produced in the production plant and/or for the products to be produced in the future in accordance with the production planning system, in particular taking into account one or more target criteria.

By its very nature, no measurement data concerning a specific product is available prior to the commencement of the production process. Therefore, the optimizer uses a prediction model that only uses input parameters for which target specifications also exist within the framework of automation. Through the actual optimization step (expediently under consideration of boundary conditions), the target values are determined in such a manner that the deviation of one or more objective variables is minimized or the probability that the objective variable will leave a validity range is minimized. Other optimization goals of a similar nature can also be implemented. The production process uses the target specifications determined in this manner as part of the automation process, wherein the open-loop and closed-loop control systems attempt to implement the target specifications as far as possible.

During the first process step, a large amount of measurement data is acquired by the automation system. This includes both those variables for which target specifications also existed along with other measurement data. In general, deviations of the actual values from the specified values occur due to a variety of effects. Through this and possibly through the use of a prediction model, which also uses other measurement data as input variables, the optimizer determines the target specifications for all subsequent process steps prior to the commencement of the next process step with the aid of a possible other prediction model.

This process can be continued until the last process step. As a whole, this optimizes production in accordance with the current best understanding of the influence of the predefined variables on the quality criteria with regard to all quality criteria to be observed. This results in fewer devaluations or complaints and improves the profitability of the production process.

After a product has been finished, quality assessment usually takes place, among other things by checking samples of the product with regard to certain quality properties, while other quality properties are also measured directly during production. This may or may not be the case for all produced products.

As soon as a new quality assessment is available for a product, the model generator can commence again to generate new prediction models, since new knowledge is available regarding the cause-effect relationships in the newly added production data and the quality assessment. In general, it is sufficient that this step be executed after a plurality of produced products rather than after each product.

By regularly updating the prediction models, changing production conditions can be taken into account and it is ensured that optimization is always aligned with the current mechanisms of action.

In a preferred variant of the invention, the process optimizer executes an evaluation with regard to one or more target criteria when determining the optimized production process within the production plant. Optimization with regard to a plurality of target criteria is particularly preferred if there is a link between the individual target criteria. It is regularly the case that optimization with regard to one target criterion simultaneously exerts an influence on another target criterion. These interrelated objective criteria should be taken into account together during optimization; otherwise, when one objective criterion is optimized separately, other associated objective criteria may leave a permissible range of values.

In accordance with an expedient variant, the evaluation is based on one of the following evaluation functions: mean absolute error, mean square error, summed loss in value per deviation of the target criteria, probability of leaving the tolerance range, or the like.

According to an additional expedient variant of the invention, the process optimizer is based on methods of linear or quadratic programs, genetic optimization, reinforcement learning with Q-tables, neural networks, simulated annealing, Metropolis, swarm algorithms, hill climbing, the Lagrange multiplier method or the like.

In an advantageous variant of the invention, the process optimizer determines the effects of target value changes on the objective specifications of the product currently being produced in the production plant and/or the product to be produced in the future in accordance with the production planning system. Thus, the process optimizer determines whether a change in the target specifications for the plant automation unit results in the at least one or more target criteria, which are the basis of the optimization, fulfilling the specified requirements.

In accordance with a particularly advantageous variant of the invention, the process optimizer comprises information on possible target value changes of the production plant, in particular of the individual plant parts. The process optimizer preferably has information from the production plant, in particular the individual plant parts, implementable target value changes such as maximum rates of change of actuator activity and/or dependencies of an adjustable variable on other variables that can also be adjusted. This allows the process optimizer to determine the target value changes that can be implemented by the production plant, in particular the plant parts. On the basis of the implementable target value changes, the target specifications for the plant automation unit can be created and forwarded to the plant automation unit. The rates of change are relevant both for switching between different products, but also for when the input data and thus the predictions regarding the volume of the product change. Common cases include, for example, variations along the strip length or strip width of a strip-shaped product. In this case, the optimizer can also generate different sets of target values, such that the target criteria for the individual product segments are fulfilled. The restrictions due to the maximum rates of change take into account that the process cannot, as a rule, run very differently for two adjacent product segments.

According to an advantageous variant of the invention, the process optimizer optimizes the production process within the production plant for a plurality of product sections. These can be sections along the length or width of a strip-shaped product, for example, or regions such as flanges or connecting bars of beam-type products.

The object is further achieved by a method for controlling a production plant consisting of a plurality of plant parts, in particular a production plant for producing industrial goods such as metallic semi-finished products, comprising the steps:

Acquisition of information concerning the products to be produced in the production plant, in particular with target criteria for the products to be produced, Monitoring of the production process within the production plant, in particular within the plant parts, Generating at least one prediction model for the product currently being produced in the production plant and/or for the products to be produced in the future, in particular with regard to compliance with the target criteria for the products currently being produced or to be produced in the future, wherein the acquired information of the production plant, in particular of the plurality of plant parts, is taken into account in the generation of the at least one prediction model, Determining an optimized production process within the production plant on the basis of the acquired information concerning the products to be produced in the production plant, the monitoring of the production process within the production plant, in particular within the plant parts, the at least one generated prediction model and production-related parameters of the production plant, in particular production-related parameters of the individual plant parts, Generating and executing target specifications for the open-loop and/or closed-loop control of the production process within the production plant, in particular the open-loop and/or closed-loop control of the processes within the plant parts.

In accordance with the method in accordance with the invention, information concerning the products to be produced in the production plant is acquired during the production process. This relates to in particular target criteria for the products to be produced. The purpose of the method in accordance with the invention is to produce the products in compliance with the objective specifications while optimally utilizing the production plant. The information concerning the products to be produced in the production plant is usually stored in a production planning system and is queried from or received by it, as the case may be. Thereby, the production planning system preferably works across the production plant, thus for all plant parts together. The production planning system contains information concerning the total products to be produced in the production plant, that is, by all plant parts.

The production plant preferably consists of a plurality of independent but successive plant parts.

The production process in the production plant is monitored, in particular within the plurality of plant parts. Monitoring takes place, for example, within the plant automation unit in the individual plant parts. The plant automation unit is designed for the monitoring and the open-loop and/or closed-loop control of the production process within the production plant, in particular for the monitoring and the open-loop and/or closed-loop control of the process within the plant parts. The plant automation units of the plurality of plant parts are independent of one another and there is no exchange of information between the plant automation units of the plurality of plant parts.

In accordance with the method in accordance with the invention, at least one prediction model is created for the product currently being produced in the production plant and/or for the products to be produced in the future. In particular, the prediction model relates to compliance with the target criteria for the products currently being produced or products to be produced in the future. The acquired information of the production plant, in particular of the plurality of plant parts, is taken into account in the generation of the at least one prediction model. Thus, the prediction model generated by the model generator provides a prediction with respect to the current and future production process in the production plant. The prediction model relates to the entire production plant, wherein the plurality of plant parts is taken into account.

For example, the model generator can use sensory and/or actuator data from the plant automation unit, in particular from the plurality of plant parts. The use of sensory data from the plant automation unit improves the accuracy of the prediction of the generated prediction model, while technological target specifications for the actuators or the individual open-loop and/or closed-loop control systems are available at an early stage of production.

In particular, the at least one prediction model determines a probability that one or more target criteria are within a defined range. The prediction model thus determines a probability that one or more target criteria of the product currently being produced in the production plant and/or products to be produced in the future lie within a defined range. On the basis of the determined probability, it can be determined whether the produced product is suitable for the intended use, i.e. has the specified product quality.

Furthermore, in accordance with the invention, an optimized production process is determined, which regulates the production within the production plant on the basis of the acquired information concerning the products to be produced in the production plant, the monitoring of the production process within the production plant, in particular within the plant parts, the at least one generated prediction model and production-related parameters of the production plant, in particular production-related parameters of the individual plant parts. This means that the production process is optimized across the production plant, taking into account all the information from the other systems in the production plant. Compared to the control of a production process known from U.S. Pat. No. 10,365,640 B2, there is not only a regulating intervention in the production process; rather, an optimization across the production plant also takes place.

On the basis of the optimized production process, target specifications for the open-loop and/or closed-loop control of the production process are generated and executed within the production plant. This relates to in particular the open-loop and/or closed-loop control of the processes within the plant parts of the production plant.

According to one variant in accordance with the invention, the production plant is a plant of the metal-producing industry or the steel industry.

In accordance with another variant of the invention, the plurality of plant parts are selected from: Electric arc furnace, blast furnace, converter, ladle furnace, vacuum ladle treatment unit, continuous caster, foundry, hot rolling mill, casting-rolling line, reheating furnace, pickling line, cold rolling mill, annealing line, galvanizing line, tinning line, painting line, cross-cutting and slitting line, tube mill, beam mill, closed-die forge, open-die forge and/or leveler.

In a preferred variant of the invention, the monitoring of the production process within the production plant, in particular within the plant parts, is carried out by means of sensors. Particularly preferably, the monitoring of the production process within the production plant, in particular within the plant parts, takes place continuously.

According to an expedient variant of the invention, the open-loop and/or closed-loop control of the production process within the production plant, in particular the open-loop and/or closed-loop control of the processes within the plant parts, is carried out by means of actuators. This allows the generated target specifications to be executed automatically.

In accordance with an advantageous variant, the method in accordance with the invention further comprises the step of storing data in a central data storage unit, in particular data with respect to the acquisition of information concerning the products to be produced in the production plant, in particular with target criteria for the products to be produced, data with respect to the monitoring of the production process within the production plant, in particular within the plant parts, data with respect to the generation of at least one prediction model for the product currently being produced in the production plant and/or for the products to be produced in the future, in particular with regard to compliance with the target criteria for the products currently being produced or products to be produced in the future, data with respect to the determination of an optimized production process within the production plant on the basis of the acquired information concerning the products to be produced in the production plant, the monitoring of the production process within the production plant, in particular within the plant parts, of the at least one generated prediction model and production-related parameters of the production plant, in particular production-related parameters of the individual plant parts, and/or data with respect to the generation and execution of target specifications for the open-loop and/or closed-loop control of the production process within the production plant, in particular the open-loop and/or closed-loop control of the processes within the plant parts. The central data storage simplifies the exchange of data between the individual parts of the production plant, in particular between the plurality of plant parts of the production plant and the higher-level components of a system in accordance with the invention designed to carry out the method in accordance with the invention.

In one variant of the invention, the target criteria are selected from: Thickness, width, length, weight, tensile strength, yield strength, Young's modulus, elongation at break, corrosion resistance, presence or number of surface defects of various types, number of cracks on the surface or within the material, DWTT results, Charpy results, transition temperatures from ductile to brittle fractures, layer thickness of the zinc layer, tube wall thickness, eccentricity, connecting bar height, flange height, flange thickness, profile, flatness and the like.

According to an advantageous variant of the invention, the generation of the at least one prediction model is based on methods of statistics, machine learning, artificial intelligence or the like. Such methods have the advantage that they are constantly improving, in particular as the database is increasing. The methods can be constantly trained, i.e. improved, which continuously improves the accuracy of the prediction model created.

In accordance with a particularly advantageous variant of the method in accordance with the invention, the method comprises the step of generating a plurality of prediction models that are different from one another, wherein the different prediction models differ, for example, with regard to the creation method, the original data and/or the learning algorithms. In particular, a plurality of prediction models is generated for the same target criterion, which, for example, take into account different original data (input parameters). It is expedient that different prediction models with different sets of input parameters are used, in particular if different data concerning a product are available at different times during production, such that some of the prediction models are already applicable, while for other prediction models the necessary input parameters are not yet fully available, because the process step in which they are generated has yet to be executed.

In accordance with one variant in accordance with the invention, different sets of input variables can be used in order to create the multiple prediction models that are different from one another. These can be values for which target specifications exist within the framework of automation (predefined variables) or measured values or signals that result reactively from the production process (measurement data). Expediently, such values are compiled on a process-step basis, such that prediction models are generated, which can be used right from the commencement of production, because they use only predefined variables, or prediction models for which all the measurement data required for the prediction model are available after a certain process step. This can be advantageous, because sometimes reactive measurement data contains information that is otherwise difficult to acquire, allowing for a more accurate prediction model.

For each set of input parameters, in general, a variety of prediction models such as, for example, neural networks, decision trees, support vector machines, linear models, discriminant analysis, Bayesian estimators, nearest neighbors, nonlinear multivariate regression, splines, can be created. Different metrics of evaluation can be used for selection. Thus, a prediction model is selected from the list of created prediction models for each step in which an updating of the target specifications for the automation is to take place, which the optimizer then uses. Evaluation metrics can be, for example, the mean square error, the mean absolute error, the coefficient of determination or the like.

In an expedient variant of the invention, when determining the optimized production process within the production plan, the prediction model that provides the current best prediction for the product currently being produced in the production plant and/or for the products to be produced in the future is taken into account. This takes place in particular taking into account one or more target criteria.

By its very nature, no measurement data concerning a specific product is available prior to the commencement of the production process. As such, the optimization uses a prediction model that only uses input parameters for which target specifications also exist within the framework of automation. Through the actual optimization step (expediently under consideration of boundary conditions), the target values are determined in such a manner that the deviation of one or more objective variables is minimized or the probability that the objective variable will leave a validity range is minimized. Other optimization goals of a similar nature can also be implemented. The production process uses the target specifications determined in this manner as part of the automation process, wherein the open-loop and closed-loop control systems attempt to implement the target specifications as far as possible.

During the first process step, a large amount of measurement data is acquired by the automation system. This includes both those variables for which target specifications also existed along with other measurement data. In general, deviations of the actual values from the specified values occur due to a variety of effects. Through this and possibly through the use of a prediction model, which also uses other measurement data as input variables, the optimizer determines the target specifications for all subsequent process steps prior to the commencement of the next process step with the aid of a possible other prediction model.

This process can be continued until the last process step. As a whole, this optimizes production in accordance with the current best understanding of the influence of the predefined variables on the quality criteria with regard to all quality criteria to be observed. This results in fewer devaluations or complaints and improves the profitability of the production process.

After a product has been finished, quality assessment usually takes place, among other things by checking samples of the product with regard to certain quality properties, while other quality properties are also measured directly during production. This may or may not be the case for all produced products.

As soon as a new quality assessment is available for a product, the model generator can commence again to generate new prediction models, since new knowledge is available regarding the cause-effect relationships in the newly added production data and the quality assessment. In general, it is sufficient that this step be executed after a plurality of produced products rather than after each product.

By regularly updating the prediction models, changing production conditions can be taken into account and it is ensured that optimization is always aligned with the current mechanisms of action.

According to a preferred variant of the invention, an evaluation with regard to one or more target criteria is performed during the determination of the optimized production process within the production plant. Optimization with regard to a plurality of target criteria is particularly preferred if there is a link between the individual target criteria. It is regularly the case that optimization with regard to one target criterion simultaneously exerts an influence on another target criterion. These interrelated objective criteria should be taken into account together during optimization; otherwise, when one objective criterion is optimized separately, other associated objective criteria may leave a permissible range of values.

In accordance with an expedient variant of the invention, the evaluation is based on one of the following evaluation functions: mean absolute error, mean square error, summed loss in value per deviation of the target criteria, probability of leaving the tolerance range, or the like.

In further advantageous variant of the invention, the at least one prediction model determines a probability that one or more target criteria are within a defined range. By means of such probability, it can be determined whether the product produced in the production plant fulfills the required quality requirements with sufficient probability, since the quality of the produced product correlates with the compliance with specified target criteria.

According to an expedient variant of the invention, the determination of the optimized production process within the production plant is based on methods of linear or quadratic programs, genetic optimization, reinforcement learning with Q-tables, neural networks, simulated annealing, Metropolis, swarm algorithms, hill climbing, the Lagrange multiplier method or the like.

In accordance with an advantageous variant of the invention, the determination of the optimized production process within the production plant comprises the checking of effects of target value changes on the objective specifications of the product currently being produced in the production plant and/or the product to be produced in the future. When determining the optimized production process, there is thus also a check of whether a change in the target specifications for the plant automation unit results in the at least one or more target criteria, which are the basis of the optimization, fulfilling the specified requirements.

In a preferred variant of the invention, the determination of the optimized production process within the production plant takes into account information on possible target value changes of the production plant, in particular of the individual plant parts. This relates in particular to target value changes that can be implemented by the production plant, in particular the individual plant parts, such as maximum rates of change of actuator activity and/or dependencies of an adjustable variable on other variables that can also be adjusted.

According to an advantageous variant of the invention, the method in accordance with the invention optimizes the production process within the production plant for a plurality of product sections. These can be sections along the length or width of a strip-shaped product, for example, or regions such as flanges or connecting bars of beam-type products.

In particular, the invention relates to a system for carrying out the method in accordance with the invention. The system can be implemented at least in part by a software program that is executed by a computing device, wherein the computing device is designed to control a production plant.

BRIEF DESCRIPTION OF THE DRAWINGS

The invention is explained in more detail below with reference to an exemplary embodiment shown in the figure. The following are shown:

FIG. 1 a block diagram of a system in accordance with the invention for controlling a production plant.

DETAILED DESCRIPTION

FIG. 1 shows a block diagram of a system 1 in accordance with the invention for controlling a production plant 2. The production plant 2 consists of a plurality of plant parts 3. In particular, the invention relates to a control unit 1 for a production plant 2 for producing industrial goods such as metallic semi-finished products, such as a plant of the metal-producing industry or the steel industry.

The plant parts 2 of the production plant 2 are, for example, an electric arc furnace, a blast furnace, a converter, a ladle furnace, a vacuum ladle treatment, a continuous casting line, a foundry, a hot rolling mill, a casting-rolling line, a reheating furnace, a pickling line, a cold rolling mill, an annealing line, a galvanizing line, a tinning line, a painting line, a cross-cutting and slitting line, a tube mill, a beam mill, a closed-die forge, an open-die forge and/or a straightening machine. In general, a plant part 2 within the meaning of the invention is a spatially and/or functionally definable part of the production plant 2. The plant parts 2 may in turn be divided into different units, such as scale washer, roughing stand, shears, finishing stand, cooling section, reel.

The production plant 2 is used for the production of products. Products are individually identifiable production pieces that move through the production plant 2, in particular sequentially through the plant parts 3 of the production plant 2. Thereby, the products are subjected to various process steps. In principle, there can be an n:m relationship (with integers n, m) between input and output products of the production plant 2 and/or plant parts 3, for example by dividing and linking products.

A process is a separately tangible work step that leads to a change in the shape or the internal or external properties of a product.

The production plant 2, in particular the individual plant parts 3, have a plant automation unit 4. The plant automation unit 4 is used for the monitoring and the open-loop and/or closed-loop control of the production process within the production plant 2 or the plant parts 3, as the case may be. The plant automation unit 4 comprises sensors 10 and actuators 11 for monitoring and open-loop and/or closed-loop control.

A sensor 10 within the meaning of the invention is a measuring device within the production plant 2 or the plant parts 3, as the case may be, which provides information concerning the processed products or the operating state of the production plant 2 or the plant parts 3, as the case may be. This can also be information from secondary processes, such as laboratory measurements regarding product properties or plant state, such that information concerning product quality is also available. The fact that a manual transmission step may be required is not intended as a restriction in this connection. In general, a sensor 10 is used to detect product properties and/or operating states within the production plant 2 and/or plant parts 3.

An actuator 11 within the meaning of the invention is an adjusting device by means of which the operating state of the production plant 2 or of the plant parts 3, as the case may be, can be directly or indirectly influenced, which at the same time can have effects on the product to be processed. Thus, an actuator 11 is used in particular to adjust the production process within the production plant 2 and/or the plant parts 3.

The system in accordance with the invention can further comprise a sensor list 12 and/or actuator list 13. The sensor list 12 contains, for example, identifiers for sensors 10 that are relevant for controlling production in the production plant 2 or the plant parts 3, as the case may be. The sensor list 12 can comprise all or only some of the sensors 10 of the production plant 2 or plant parts 3, as the case may be. Accordingly, the actuator list contains, for example, identifiers for actuators 11 that are relevant for controlling production in the production plant 2 or the plant parts 3, as the case may be. The actuator list 13 can comprise all or only some of the actuators 11 of the production plant 2 or the plant parts 3, as the case may be.

Automation within the meaning of the invention refers to the totality of all open-loop and closed-loop control processes required to operate the production plant 2 or the plant parts 3, as the case may be, along with the hardware required for this purpose. Among other things, automation makes use of sensors 10 and actuators 11.

As a rule, the plant automation unit 4 requires specifications on how a work step is to be carried out to generate a product. In accordance with the invention, such specifications are referred to as target values.

In particular, the plant automation unit 4 accesses data from or transmits data to the sensors 10 and/or actuators 11.

The system 1 in accordance with the invention or the production plant 2, as the case may be, comprises a production planning system 5 having information concerning the products to be produced in the production plant 2. In particular, the production planning system 5 contains target criteria for the products to be produced.

A number of properties play a role in the production of certain products or their saleability, as the case may be. In accordance with the invention, the totality of all properties in question is referred to as target criteria. For example, the target criteria are selected from: Thickness, width, length, weight, tensile strength, yield strength, Young's modulus, elongation at break, corrosion resistance, presence or number of surface defects of various types, number of cracks on the surface or within the material, DWTT results, Charpy results, transition temperatures from ductile to brittle fractures, layer thickness of the zinc layer, tube wall thickness, eccentricity, connecting bar height, flange height, flange thickness, profile, flatness and the like.

If a target criterion is not fulfilled, it may be necessary to reassign a product to another use, which generally involves lower remuneration. In the worst case, the product cannot be used and must be disposed of or recycled.

The system 1 in accordance with the invention further comprises a model generator 6 for generating at least one prediction model 7 for the product currently being produced in the production plant 2 and/or for the products to be produced in the future in accordance with the production planning system 5. In particular, the generated prediction model 7 relates to compliance with the target criteria for the products currently being produced or products to be produced in the future. The model generator 6 takes into account the results of the monitoring of the production plant 2, in particular of the plurality of plant parts 3, when generating the at least one prediction model 7.

The model generator 6 establishes a relationship between sensor and actuator data and the product quality of the produced product. For example, the model generator 6 is based on methods of statistics, machine learning, artificial intelligence or the like. Such process can be generally understood as a function that assigns a one-dimensional or multidimensional vector to an n-dimensional vector. The multidimensional case refers to the fact that, optionally, a plurality of target criteria is to be described simultaneously, but is not a restriction. In order to generate the at least one prediction model 7, correlations to individual sensory or actuator parameters are investigated. This can be done by checking correlation, shared information, Shapley values, feature ranking or the like, or only on a model-intrinsic basis. Thereby, some of the parameters listed in the sensor and actuator list 12, 13 can be sorted out as not relevant for the respective target criterion, but this does not constitute a restriction. In addition to the different types of models, they can also differ in the choice of basic parameters ("hyperparameters"—for example, number and linkage of neurons in neural networks). The quality of a prediction model 7 is defined by a metric; common variants are, for example, L1-measure or L2-measure ("mean absolute error" or "mean square error") besides various others. Importantly, the metric makes an assessment of how well a prediction model 7 is able to predict the target criteria from the sensor and actuator data. For each target criterion, which evaluation measure is used is defined. When selecting parameters, special emphasis can be placed on the distinction between actuators 11 and sensors 10, since it is only possible to influence the process and the product via the actuators 11.

A trained prediction model 7 uses all or a selection of the sensor and actuator data in order to make a prediction for one or more of the target criteria. The prediction is to at least contain an expected value for the target criterion, but can additionally contain a probability that the target criterion exceeds or falls below a certain critical minimum or maximum value.

The system 1 in accordance with the invention further comprises a production optimizer 8 for determining an optimized production process within the production plant 2 on the basis of the data from the plant automation unit 4, the production planning system 5 and the prediction model 7 generated by the model generator 6. When determining the optimized production process within the production plant 2, the production optimizer 8 takes into account the production-related specifications of the individual plant parts 3.

For example, one or more optimization procedures 15 are stored or implemented, as the case may be, in the production optimizer 8.

The determination of the optimized production process within the production plant 2, in particular the at least one optimization procedure 15, is based for example on methods of linear or quadratic programs, genetic optimization, reinforcement learning with Q-tables, neural networks, simulated annealing, Metropolis, swarm algorithms, Hill Climbing, the Lagrange multiplier method or the like.

The production optimizer 8 accesses the at least one prediction model 7 in order to use it to predict effects of certain parameter choices. In turn, various mechanisms may be used for optimization. Thus, the goal can be to hit an objective variable as accurately as possible or to minimize the probability that a particular variable is outside the required range. In particular, actuator variables are thereby taken into account, since they can be used to influence the product and achieve a change in the objective variables. During optimization, constraints can be taken into account such that a concretely implementable set of target specifications is also the result of the optimization.

The production optimizer 8 preferably takes into account constraints 16. The constraints must be fulfilled, for example, so that a specification of target values is also possible in terms of plant or process technology. This relates to, for example, maximum rates of change of actuator activity and/or dependencies of an adjustable variable on other variables that can also be adjusted.

Expediently, the production optimizer 8 makes use of a target optimization 17. The target optimization 17 is the concretely used method that makes use of the totality of the presented subsystems in order to finally determine which target specifications are taken to achieve certain objective variables. In general, a product must simultaneously achieve a plurality of objective variables, such that either it is ensured that only different parameters are assigned target values for the different target criteria, or a joint target optimization must be created for the two or more target criteria, such that a unique target value is assigned for the selected parameter. Target optimization is used prior to the commencement of production in order to generate the initial target specifications. In the further course, target specifications for subsequent process steps can also be generated or updated at a later point in time, as long as the product has not yet left the sphere of influence of a certain actuator 11. During such updating, a different target optimization can also be used for a given objective variable, for example because certain sensory data only become available during or after a process step, but allow a more precise/better target specification for parameters that are still free.

A production plant control unit 9 generates target specifications for the plant automation unit 4 on the basis of the optimized production process determined by the production optimizer 8.

The system 1 in accordance with the invention of FIG. 1 further comprises a central data storage unit 14. The other components of the system 1 may access this central data storage unit 14 as necessary. In such central data storage unit 14, for example, the production plant 2 or the plant parts 3, as the case may be, and in particular the plant automation unit 4 can store data. For example, data from the sensors 10 and/or actuators 11 are stored there. The data stored in the central data storage unit 14 is used by the model generator 6 to generate the at least one prediction model 7.

Particularly preferably, the model generator 6 generates a plurality of prediction models 7 that are different from one another. The different prediction models 7 differ, for example, with regard to the creation method, original data and/or learning algorithms.

The process optimizer 8 takes into account the prediction model 7 that provides the current best prediction for the product currently being produced in the production plant 2 and/or for the products to be produced in the future in accordance with the production planning system 5, in particular taking into account one or more target criteria.

Furthermore, the process optimizer 8 executes an evaluation with regard to one or more target criteria when determining the optimized production process within the production plant 2. This takes place, for example, by taking into account the target criteria through the optimization procedure 15.

In particular, the process optimizer 8 determines the effects of target value changes on the objective specifications of the product currently being produced in the production plant 2 and/or the product to be produced in the future in accordance with the production planning system 5. For example, this is part of the target optimization 17.

Advantageously, the process optimizer 8 comprises information on possible target value changes of the production plant 2, in particular of the individual plant parts 3. The information relates in particular to target value changes that can be implemented by the production plant 2, in particular the individual plant parts 3, such as maximum rates of change of actuator activity and/or dependencies of an adjustable variable on other variables that can also be adjusted. This information is part of the constraints 16.

The invention further relates to a method for controlling a production plant 2 consisting of a plurality of plant parts 3, in particular a production plant 2 for producing industrial goods such as metallic semi-finished products. The method is carried out, for example, by a system 1 as shown in FIG. 1. The system 1 can be implemented at least in part by a software program that is executed by a computing device, wherein the computing device is designed to control a production plant 2.

The method in accordance with the invention comprises the following steps:

Acquisition of information concerning the products to be produced in the production plant 2, in particular target criteria for the products to be produced, Monitoring of the production process within the production plant 2, in particular within the plant parts 3, Generating at least one prediction model 7 for the product currently being produced in the production plant 2 and/or for the products to be produced in the future, in particular with regard to compliance with the target criteria for the products currently being produced or to be produced in the future, wherein the acquired information of the production plant 2, in particular of the plurality of plant parts 3, is taken into account in the generation of the at least one prediction model 7, Determining an optimized production process within the production plant 2 on the basis of the acquired information concerning the products to be produced in the production plant 2, the monitoring of the production process within the production plant 2, in particular within the plant parts 3, the at least one generated prediction model 7 and production-related parameters of the production plant 2, in particular production-related parameters of the individual plant parts 3, Generating and executing target specifications for the open-loop and/or closed-loop control of the production process within the production plant 2, in particular the open-loop and/or closed-loop control of the processes within the plant parts 3.

The monitoring of the production process within the production plant 2, in particular within the plant parts 3, is carried out by means of sensors 10. In particular, the monitoring of the production process within the production plant 2, in particular within the plant parts 3, takes place continuously.

The method in accordance with the invention further comprises the step of storing data in a central data storage unit 14, in particular data with respect to the acquisition of information concerning the products to be produced in the production plant 2, in particular with target criteria for the products to be produced, data with respect to the monitoring of the production process within the production plant 2, in particular within the plant parts 3, data with respect to the generation of at least one prediction model 7 for the product currently being produced in the production plant 2 and/or for the products to be produced in the future, in particular with regard to the compliance with the target criteria for the products currently being produced or products to be produced in the future, data with respect to the determination of an optimized production process within the production plant 2 on the basis of the acquired information concerning the products to be produced in the production plant 2, the monitoring of the production process within the production plant 2, in particular within the plant parts 3, of the at least one generated prediction model 7 and production-related parameters of the production plant 2, in particular production-related parameters of the individual plant parts 3, and/or data with respect to the generation and execution of target specifications for the open-loop and/or closed-loop control of the production process within the production plant 2, in particular the open-loop and/or closed-loop control of the processes within the plant parts 3.

The generation of the at least one prediction model 7 is based, for example, on methods of statistics, machine learning, artificial intelligence or the like.

For example, the at least one prediction model 7 determines a probability that one or more target criteria are within a defined range.

In a particularly advantageous variant, the method in accordance with the invention comprises the step of generating a plurality of prediction models 7 that are different from one another, wherein the different prediction models 7 differ, for example, with regard to the creation method, the original data and/or the learning algorithms.

When determining the optimized production process within the production plant 2, in the aforementioned variant the prediction model 7 that provides the currently best prediction for the product currently being produced in the production plant 2 and/or for the products to be produced in the future, is taken into account, in particular taking into account one or more target criteria.

When determining the optimized production process within the production plant 2, an evaluation with regard to one or more target criteria is carried out in particular.

The determination of the optimized production process within the production plant 2 checks the effects of target value changes on the objective specifications of the product currently being produced in the production plant 2 and/or the product to be produced in the future.

Furthermore, the determination of the optimized production process within the production plant 2 can take into account information on possible target value changes of the production plant 2, in particular of the individual plant parts 3. These are, for example, target value changes that can be implemented by the production plant 2, in particular the individual plant parts 3, such as maximum rates of change of actuator activity and/or dependencies of an adjustable variable on other variables that can also be adjusted.

The production sequence 18 of the production plant 2 of FIG. 1 is indicated by an arrow, in accordance with which production proceeds sequentially from left to right. Thus, successive production steps are carried out sequentially, wherein the control in accordance with the invention relates to all sequential production steps.

In the following, and independently of the exemplary embodiment from FIG. 1, an application scenario for the method in accordance with the invention is explained. It is known that, with regard to the mechanical properties of metal products, a heat treatment step has a strong influence. This makes it possible to have a corrective effect on certain process deviations in the previous process stages (for example, melting, casting, hot rolling, pickling, cold rolling). For this purpose, different models 7, which allow a prediction of the mechanical properties or a prediction that these meet or leave a certain range of validity, as the case may be, are trained. Some of the models 7 use only predefined variables for this purpose, such as carbon content, manganese content, hot rolling temperature, coiler temperature, degree of cold forming or the like. Other models 7 can also use reactive measured variables, such as drive power or forces in forming processes or in the movement of a strip, as the case may be. The optimizer 8 uses such a model 7 to determine the target specifications for the individual process steps. As soon as a process step is completed (for example, metallurgical treatment to adjust the chemical analysis), specific measured values are also available. The same or a new model 7 can then be used to generate updated target specifications within the optimizer 8. If the same model 7 as before is used or a different one is used, which however uses partly the same input parameters as before, in particular those which are predefined variables of the process just run, then the optimizer 8 can no longer use the variables already implemented during the melting process for optimization, but must firmly use the values determined by the sensor system 10 for these. This makes optimal use of the information concerning the current product piece. The specification for further process steps is then based on any deviations in the chemical analysis. In a similar manner, once the hot rolling process is complete, the specifications for subsequent process steps can be adjusted in accordance with the actual hot rolling or coiling temperature, or a different model 7 can be used, for example using the rolling forces as an input variable. Such process is then repeated with the completion of cold rolling, such that a correspondingly improved set of nominal specifications is available for the process on the annealing line.

Thereby, it is important that, first, the generation of a plurality of models 7 is part of system 1, that, in addition, a plurality of quality criteria are optimized simultaneously and, thirdly, that continuous improvement of all sub-processes takes place in each case using the maximum available information.

LIST OF REFERENCE SIGNS

1 System
2 Production plant
3 Plant part
4 Plant automation unit
5 Production planning system
6 Model generator
7 Prediction model
8 Production optimizer
9 Production plant control unit
10 Sensor
11 Actuator
12 Sensor list
13 Actuator list
14 Data storage unit
15 Optimization procedure
16 Constraints
17 Target optimization
18 Production sequence

The invention claimed is:

1. A system (1) for controlling a production plant (2) having a plurality of plant parts (3) for producing metallic semi-finished products, comprising:
 a plant automation unit (4) for monitoring and for open-loop and/or closed-loop control of a production process within the production plant (2), including monitoring and open-loop and/or closed-loop control of the plant parts (3);
 a production planning system (5) having information concerning products to be produced in the production plant (2), including target criteria for the products to be produced;
 a model generator (6) for generating at least one prediction model (7) for a product currently being produced in the production plant (2) and/or for the products to be produced in the future in accordance with the production planning system (5), in compliance with the target criteria for the product currently being produced or the products to be produced in the future,
  wherein the model generator (6) takes into account results of the monitoring of the production plant (2), including the plurality of plant parts (3), when generating the at least one prediction model (7), and
  wherein the at least one prediction model (7) is configured to predict compliance of the product with the target criteria, including predicting at least one of
  (i) an expected value of a target criterion or
  (ii) a probability that the target criterion lies within a defined range;
 a production optimizer (8) for determining an optimized production process within the production plant (2) including target specifications for control commands based on data from the plant automation unit (4), the production planning system (5), and the compliance with the target criteria predicted by the prediction model (7) generated by the model generator (6),
  wherein the production optimizer (8) takes into account production-related specifications of the plant parts (3) in determining the optimized production process within the production plant (2); and
 a production plant control unit (9) for executing the target specifications for the plant automation unit (4) based on the optimized production process determined by the production optimizer (8).

2. The system (1) according to claim 1,
wherein each plant part (3) of the plurality of plant parts (3) comprises sensors (10) for detecting product properties, process parameters, and/or operating states within the respective plant part (3).

3. The system (1) according to claim 1,
further comprising a central data storage unit (14) for individual components of the system (1), wherein the individual components of the system (1) can access the data and can adapt the data.

4. The system (1) according to claim 1,
wherein the target criteria are selected from the group consisting of thickness, width, length, weight, tensile strength, yield strength, Young's modulus, elongation at break, corrosion resistance, presence or number of surface defects of various types, number of cracks on a surface or within a material, DWTT results, Charpy results, transition temperatures from ductile to brittle fractures, layer thickness of a zinc layer, tube wall thickness, eccentricity, connecting bar height, flange height, flange thickness, profile, and flatness, and
wherein the at least one prediction model (7) is configured to predict the probability that the target criterion lies within the defined range.

5. The system (1) according to claim 1,
wherein the model generator (6) generates multiple different prediction models (7),
wherein the different prediction models (7) differ with regard to a creation method, original data and/or learning algorithms, and
wherein the multiple different prediction models do not predict the control variables.

6. The system (1) according to claim 5,
wherein the production optimizer (8) takes into account the prediction model (7) that provides currently best prediction for the product currently being produced in the production plant (2) and/or for the products to be produced in the future in accordance with the production planning system (5), including taking into account the target criteria.

7. The system (1) according to claim 1,
wherein the production optimizer (8) executes an evaluation with regard to the target criteria when determining the optimized production process within the production plant (2).

8. The system (1) according to claim 1,
wherein the production optimizer (8) determines effects of target value changes on objective specifications of the product currently being produced in the production plant (2) and/or of the product to be produced in the future in accordance with the production planning system (5).

9. The system (1) according to claim 8,
wherein the production optimizer (8) comprises information on possible target value changes of the production plant (2), including the plant parts (3), including target value changes that can be implemented by the production plant (2), including the plant parts (3), and wherein the possible target value changes are maximum rates of change of actuator activity and/or dependencies of an adjustable variable on other variables that can also be adjusted.

10. The system (1) according to claim 1, wherein the production optimizer (8) optimizes the production process within the production plant (2) for a plurality of product sections.

11. A method for controlling a production plant (2) having of a plurality of plant parts (3) for producing metallic semi-finished products, comprising:

acquiring information concerning products to be produced in the production plant (2), including target criteria for the products to be produced;

monitoring a production process within the production plant (2), including within the plant parts (3);

generating at least one prediction model (7) for a product currently being produced in the production plant (2) and/or for the products to be produced in the future, in compliance with target criteria for the product currently being produced or the products to be produced in the future, wherein the acquired information of the production plant (2), including the plurality of plant parts (3), is taken into account in generating the at least one prediction model (7), and wherein the at least one prediction model (7) is configured to predict compliance of the product with the target criteria, including predicting at least one of (i) an expected value of a target criterion or (ii) a probability that the target criterion lies within a defined range;

determining an optimized production process within the production plant (2) including target specifications for control commands based on the acquired information concerning the products to be produced in the production plant (2), the monitoring of the production process within the production plant (2), including the plant parts (3), the compliance with the target criteria predicted by the at least one prediction model (7), and production-related parameters of the production plant (2), including production-related parameters of the plant parts (3); and executing the target specifications for an open-loop and/or closed-loop control of the production process within the production plant (2), including an open-loop and/or closed-loop control of processes within the plant parts (3).

12. The method according to claim 11, wherein the monitoring of the production process within the production plant (2), including within the plant parts (3), is carried out by sensors (10), and wherein the monitoring of the production process within the production plant (2), including within the plant parts (3), takes place continuously.

13. The method according to claim 11, further comprising storing data in a central data storage unit (14), including data with respect to the acquiring of information concerning the products to be produced in the production plant (2), including target criteria for the products to be produced, data with respect to the monitoring of the production process within the production plant (2), including the plant parts (3), data with respect to the generating the at least one prediction model (7) for the product currently being produced in the production plant (2) and/or for the products to be produced in the future, including the compliance with the target criteria for the products currently being produced or products to be produced in the future, data with respect to the determining of the optimized production process within the production plant (2) based on the acquired information concerning the products to be produced in the production plant (2), the monitoring of the production process within the production plant (2), including within the plant parts (3), of the at least one prediction model (7) and production-related parameters of the production plant (2), including production-related parameters of the plant parts (3), and/or data with respect to the generating and executing of target specifications for the open-loop and/or closed-loop control of the production process within the production plant (2), including the open-loop and/or closed-loop control of the processes within the plant parts (3).

14. The method according to claim 11, wherein the generating of the at least one prediction model (7) is based on methods of statistics, machine learning, or artificial intelligence, and wherein the at least one prediction model (7) is configured to predict the probability that the target criterion lies within the defined range.

15. The method according to claim 11, further comprising generating a plurality of different prediction models (7), wherein the different prediction models (7) differ with regard to a creation method, original data and/or learning algorithms.

16. The method according to claim 15, wherein the determining of the optimized production process within the production plant (2) takes into account the prediction model (7) that provides currently best prediction for the product currently being produced in the production plant (2) and/or for the products to be produced in the future, taking into account the target criteria.

17. The method according to claim 11, wherein in determining the optimized production process within the production plant (2), an evaluation with regard to the target criteria is carried out.

18. The method according to claim 11, wherein the at least one prediction model (7) determines a probability that the target criteria are within a defined range.

19. The method according to claim 11, wherein the determining of the optimized production process within the production plant (2) checks effects of target value changes on objective specifications of the product currently being produced in the production plant (2) and/or the product to be produced in the future.

20. The method according to claim 11, wherein the determining of the optimized production process within the production plant (2) takes into account information on possible target value changes of the production plant (2), including the plant parts (3), including target value changes that can be implemented by the production plant (2), including the plant parts (3), and wherein the possible target value changes are maximum rates of change of actuator activity and/or dependencies of an adjustable variable on other variables that can also be adjusted.

* * * * *